March 12, 1968 J. W. HIPELIUS ET AL 3,372,850

TAPE DRIVING ASSEMBLY HAVING SHIFTABLE PINCH ROLLER

Filed Feb. 15, 1966

Inventors:
John W. Hipelius,
George B. Shields.
By Barry L. Clark
John E. Peele Jr.
Attys United States Patent Office 3,372,850
Patented Mar. 12, 1968

3,372,850

TAPE DRIVING ASSEMBLY HAVING SHIFTABLE PINCH ROLLER

John W. Hipelius, Skokie, and George B. Shields, Morton Grove, Ill., assignors to Bell & Howell Company, Chicago, Ill., a corporation of Illinois Filed Feb. 15, 1966, Ser. No. 527,542
7 Claims. (Cl. 226—180)

The present invention relates to tape management. Particularly the invention relates to transport means for record tape. Specifically the invention relates to a tape driving assembly for moving record tape across a transducer or magnetic head of the character found in magnetic tape recorders and reproduction devices and the like.

A conventional tape driving assembly of the class with which the present invention concerns itself is characterized by a pair of cooperating rollers such as a driven capstan and pinch roller adapted to tractionally engage on opposite sides of a tape to drive it in operative engagement across a magnetic head which may be for magnetic recording or for reproduction. Customarily, whether a magnetic recorder or reproducing device comprises a single or bi-directional tape drive with one or two magnetic head positions, there is provided only one tape driving assembly.

In heretofore known devices having bi-directional tape movement, both rollers of a tape driving assembly are arranged in a manner such that they simultaneously engage therebetween tape at the position the tape is first tangent with such assembly. As a consequence of that arrangement, any disturbance resulting from unevenness or variation in tape drive will be tape transmitted to, and registered at, the magnetic head across which tape is moving causing a corresponding disturbance in recording or reproduction as the case may be. Heretofore, such disturbances at magnetic heads have been tolerated because they arise from factors inherent in tape driving assemblies. For example, characteristically, the pinch roller, of an assembly of the latter and a capstan, is of resilient fabrication. Accordingly, the pressure with which driven tape is engaged by its pinch roller against an associated capstan will vary. Such variation may be responsible for disturbances which are reflected at, or impressed upon, the magnetic head across which the tape is driven to thereby impair quality of recording or reproduction.

It is the principal object of the present invention to provide an improved assembly for driving magnetic record tape and the like across a magnetic recording or reproduction head which minimizes disturbances thereat.

It is a further object of the invention to provide in such improved assembly a pair of tape driving rollers arranged in a manner such that their driving force is impressed upon tape downstream of the first tangential position of such tape and said assembly.

It is another object of the invention to provide means for adjusting the relative angular disposition of the tape driving rollers to alter the position at which they are adapted for tape engagement to the end that tape driving force will be applied downstream of the position of first tangency of a tape and its driving assembly regardless of the direction of tape movement.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

Figures 1, 2, 3, 4:
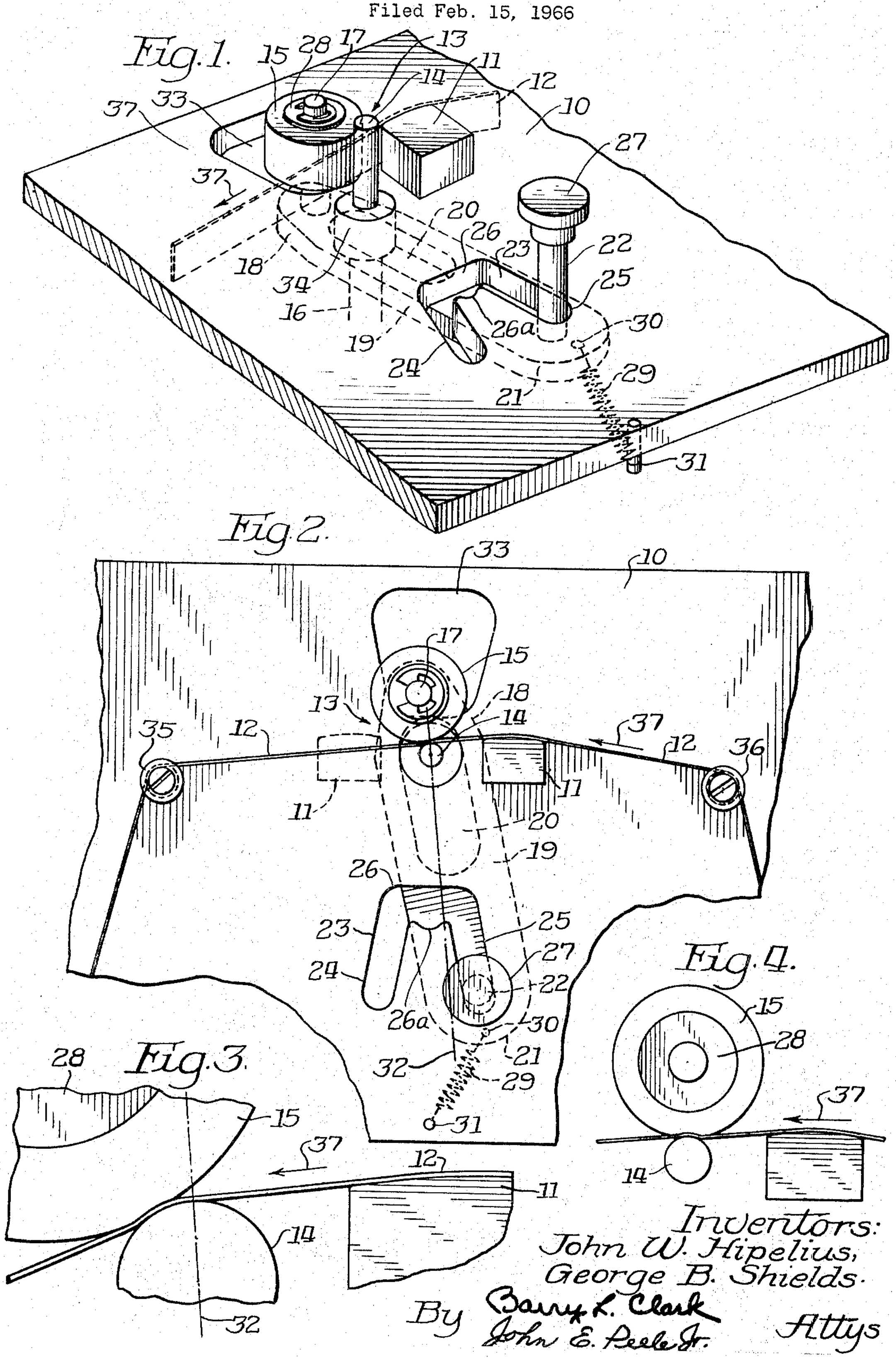
FIG. 1 is a perspective view of a fragment of an apparatus shown schematically and employing a magnetic tape transporting means embodying the present invention, parts being shown dotted for the purpose of illustration.
FIG. 2 is a top plan view of said embodiment shown mounted on said apparatus, parts being shown dotted for the purpose of illustration.
FIG. 3 is an enlarged detail of a fragment of said embodiment viewed from the top, the angular relationship of the tape driving rollers being distorted to emphasize the relationship of driven tape, said rollers and the magnetic head; and, FIG. 4 is a view similar to FIG. 3 showing a prior art arrangement of the tape driving assembly in a bi-directional tape recorder.

Referring now more particularly to FIGS. 1 and 2, there is seen a fragmentary portion of the flat or table 10 of a device such as a magnetic tape recorder or player having a magnetic head 11 supported above said table. The head may be of conventional construction and is adapted to magnetically record on, or sense for reproduction from, a record tape 12 (shown dotted in FIG. 1) which is driven across said head. The mechanism for driving the tape is an assembly generally designated 13 which includes a pair of opposed cylinders or rollers one of which may be a conventional reversibly driven capstan 14 and the opposed of which may be a pinch roller 15, said capstan and pinch roller being arranged to motivate said tape longitudinally thereof by tractionally engaging against opposite faces thereof, as illustrated in the drawings.

In the exemplified embodiment capstan 14 is constrained for rotation above and in fixed relationship to table 10, said capstan having a spindular lower end portion 16 disposed below the table 10 and connected to reversible drive means (not shown) for capstan rotation. The pinch roller 15 is journalled above flat 10 on the upper end of a vertical roller supporting shaft 17 in tape driving association with the capstan 14 by suitable rotational bearing means 28. The lower end portion of shaft 17 is retained in one end portion 18 of a flat rockable elongated mount member 19 which is disposed beneath and parallel to the table 10.

A medial portion of the mount member has an elongated slot 20 through which the capstan is vertically projected thereby forming a relatively fixed axis relative to which said mount member is angularly and slidably adjustable in a manner hereinafter to become more fully apparent. A cylindrical bearing 34 which is secured on a medial portion of capstan 14 engages in said slot 20, said bearing being proportioned for sliding engagement with the sides of said slot to prevent undesirable shifting of the mount 19.

At its opposite end portion 21 mount 19 secures the lower end portion of a vertical handle member in the form of a post or guide pin 22 which is projected upwardly through a U-shaped slot 23 in the table 10. The upper end of the post 22 may carry or be fashioned with a knob 27 for manipulation of said post along the slot 23 of the opposite legs 24 and 25 of which project from the connecting slot part 26 away from capstan 14. In FIGS. 2 and 3 an imaginary center line 32 is shown, such line passing through the rotational center of the capstan 14 and in the specific embodiment shown, being perpendicular to the tape in the path between where it contacts the head 11 and tangentially contacts the capstan 14. As illustrated, the legs 24 and 25 of the slot 23 slope outwardly from each other and from the imaginary center line 32 as they extend away from said capstan which falls on said center line and serves as a center relative to which the slot legs 24 and 25 are arranged symmetrically. Because said slot defines a path for the post 22, it accordingly determines the limit of movement of the mount member 19. A locking notch 26*a* is formed in the connecting slot 26 and serves to hold the post 22 in a position wherein rollers 14 and 15 are held apart against the bias of a spring 29 to permit threading of the tape between the rollers.

The foregoing arrangement positions the pinch roller 15 and the post 22 on opposite sides of the capstan 14 and adapts the mount member 19 for longitudinal adjustment about the capstan within the slot 20. The expansion spring 29, the opposite ends of which are connected to the mount end portion 21 as at 30 and to any suitable fixed member such as peg 31, biases the pinch roller into tape driving association with the capstan, said spring exerting tension on said mount. Moreover, because the mount member 19 is adapted for rocking adjustment in a horizontal plane about capstan 14, the angular relationship between said capstan and said pinch roller can be varied.

By referring to FIGS. 1 and 2, it is appreciated that the mount member 19 is adapted for two operative conditions, namely, in that position which is shown in said figures and in an alternative position in which the post 22 is biased toward the outer end of the slot leg 24. To condition said mount member from the former to the latter, post 22 would be moved manually toward the capstan 27 against the tension of spring 29 and then passed through the connecting portion 26 of the slot 23 to the entry of slot leg 24 toward the outer end of the latter of which post 22 will be drawn by said spring. Such adjustment will partially rotate the pinch roller about and change its angular relationship with the capstan from the condition shown in FIG. 1 to an alternative condition on the opposite side of the imaginary center line 32. To accommodate adjusting movement of said pinch roller, the table 10 has an enlarged opening 33 through which the shaft 17 projects.

As illustrated in FIG. 2, a pair of idler roller assemblies 35 and 36 are mounted on opposite sides of the tape driving assembly 13 and beyond the head 11. They serve as guides for tape 12 which may be reversibly conventionally supplied from and taken up on opposed reels (not shown). The tape is adapted to be driven by assembly 13 in the direction of arrow 37 from an upstream supply (not shown) across said head 11 downstream of which said last mentioned assembly is disposed with the pinch roller as shown in the drawings.

When the tape is to be reversed from the direction indicated by arrow 37, the operative head 11 is repositioned by suitable means, the character of which is already known in the art, from the solid line position to the dotted line position of FIG. 2. At the same time, rotation of the capstan 14 is reversed by the drive means (not shown). It is appreciated that with bi-directional tape movement, the alternate head positions preferably should be symmetrical with respect to the center line 32.

As previously mentioned, the center line 32 defines the position of an imaginary vertical line on the capstan along which tape 12 is normally first tangent to said capstan as it is driven downstream across an operative head conditioned on either side of the capstan. In accordance with the present invention, such line of tangency may be characterized as being disposed medially of the operative head 11 and the position of drive engagement of the capstan and the pinch roller with the tape regardless of the direction of tape movement, as the pinch roller is to be shifted to correspond with tape movement direction. Therefore, disturbances which result from the tape driving forces will not be reflected at the head 11. By referring to FIG. 3, the concept is readily appreciated when it is considered that the driving force exerted by the assembly of the capstan and the pinch roller is applied by impingement of the tape downstream of the position at which the tape first engages the capstan. Were the pinch roller to engage the capstan at the line of tangency as shown in FIG. 4 (prior art) disturbances in the tape as a result of variation in tape driving force would be much more readily reflected at the magnetic head than when using the arrangement of parts which is shown in FIG. 3.

As many substitutions or changes could be made in the above described construction and as many apparently widely different embodiments of the invention within the scope of the claims could be constructed without departing from the scope and spirit thereof, it is intended that all matter contained in the accompanying specification shall be interpreted as being illustrative and not in a limiting sense.

The embodiments of the invention in which an exclusive property or privilege is claimed are defined as follows:

1. In a mechanism for moving magnetic record tape and the like in a stream across an operative head,
   - a driven assembly comprising a pair of roller members mounted to impinge therebetween the tape for continuous tractional motivation thereof,
   - said roller members arranged in a manner such that the position of tape impingement is disposed downstream of the position of first tangency with said assembly of thereto traveling tape, and
   - roller adjusting means for relatively angularly shifting said roller members to change the position of motivating tape impingement downstream of the position of first tangency with said assembly of traveling tape regardless of the direction of tape movement.

2. A tape moving mechanism as defined in claim 1 in which the roller adjusting means comprises roller shifting means for electively rocking a first of said roller members about a center provided by the other and means for releasably holding said roller members in tractional association with thereby motivated tape.

3. A tape moving mechanism as defined in claim 1 in which the roller adjusting means comprises a mount member for a first of the roller members rockable about a center provided by the other of said roller members and arranged for retractable extension therefrom of the first of the roller members to releasably tractionally impinge magnetic record tape in all positions of roller member adjustment.

4. A tape moving mechanism as defined in claim 3 in which the mount member has an elongated medial slot, the other of said roller members having an axial portion disposed in said slot, and mount biasing means for releasably holding said roller members in tape motivating association.

5. A tape moving mechanism as defined in claim 1 further characterized by a relatively fixed deck above which said roller members are adapted to motivatingly impinge tape;
   - a mount member having an elongated slot and rockably supported below said deck,
   - a first of said roller members being fixed relative to said deck and having a portion disposed in said slot,
   - a portion of the other of said roller members and a mount control member connected to said mount member in opposed positions beyond opposite ends of said slot,
   - said deck having angular guide slot means,
   - said control member projecting through said guide slot means for adjusting the angular position of the other of said roller members within the limits of said guide slot means by rocking said mount member about said first roller member portion, and
   - biasing means connected to said mount member for conditioning said assembly for tape motivation at varying angular relationships of said roller members.

6. The tape moving mechanism of claim 5 further characterized by a locking means in said angular guide slot means for selectively locking said mount member in a position wherein said pair of roller members are held apart from each other against the force of said biasing means to permit threading of a tape between said pair of roller members.

7. The tape moving mechanism of claim 5 wherein said angular guide slot means is substantially U-shaped.

References Cited

UNITED STATES PATENTS

| | | | |
|---|---|---|---|
| 2,988,257 | 6/1961 | Lasarev | 226—187 |
| 2,998,906 | 9/1966 | Vice | 226—187 |

M. HENSON WOOD, Jr., *Primary Examiner.*

R. A. SCHACHER, *Assistant Examiner.*